(12) United States Patent
Patel

(10) Patent No.: US 10,457,021 B2
(45) Date of Patent: Oct. 29, 2019

(54) BIO RESIN PAPERBOARD CONTAINERS AND CARTONS

(71) Applicant: Amisha Patel, Carlsbad, CA (US)

(72) Inventor: Amisha Patel, Carlsbad, CA (US)

(*) Notice: Subject to any disclaimer, the term of this patent is extended or adjusted under 35 U.S.C. 154(b) by 0 days.

(21) Appl. No.: 15/083,654

(22) Filed: Mar. 29, 2016

(65) Prior Publication Data

US 2018/0207917 A1  Jul. 26, 2018

(51) Int. Cl.
| | |
|---|---|
| B32B 27/10 | (2006.01) |
| B32B 15/09 | (2006.01) |
| C08L 67/04 | (2006.01) |
| C08G 63/08 | (2006.01) |
| B32B 15/08 | (2006.01) |
| B32B 1/08 | (2006.01) |
| B32B 1/02 | (2006.01) |
| B32B 15/085 | (2006.01) |
| B32B 15/12 | (2006.01) |
| B32B 27/32 | (2006.01) |
| B32B 29/00 | (2006.01) |
| B32B 27/36 | (2006.01) |

(52) U.S. Cl.
CPC ............... *B32B 27/10* (2013.01); *B32B 1/02* (2013.01); *B32B 1/08* (2013.01); *B32B 15/08* (2013.01); *B32B 15/085* (2013.01); *B32B 15/09* (2013.01); *B32B 15/12* (2013.01); *B32B 27/32* (2013.01); *B32B 27/327* (2013.01); *B32B 27/36* (2013.01); *B32B 29/002* (2013.01); *C08G 63/08* (2013.01); *C08L 67/04* (2013.01); *B32B 2315/08* (2013.01); *B32B 2323/04* (2013.01); *B32B 2367/00* (2013.01)

(58) Field of Classification Search
CPC .. B32B 1/02; B32B 1/08; B32B 15/08; B32B 15/085; B32B 15/09; B32B 15/12; B32B 27/10; B32B 27/32; B32B 27/327; B32B 27/36; B32B 29/002
See application file for complete search history.

(56) References Cited

U.S. PATENT DOCUMENTS

| | | | |
|---|---|---|---|
| 5,213,858 A | 5/1993 | Tanner | |
| 5,434,004 A | 7/1995 | Ajioka | |
| 7,348,052 B2* | 3/2008 | Mueller | B32B 9/04 156/297 |
| 8,637,126 B2 | 1/2014 | Cleveland | |
| 8,852,335 B2* | 10/2014 | Tolibas-Spurlock | B32B 1/02 106/618 |
| 8,962,118 B2 | 2/2015 | Chung | |
| 9,227,750 B2 | 1/2016 | Franic | |
| 2003/0211348 A1 | 11/2003 | Mueller | |
| 2008/0099540 A1 | 5/2008 | Mueller | |
| 2009/0017240 A1 | 1/2009 | Charbonnel | |

(Continued)

*Primary Examiner* — Walter Aughenbaugh
(74) *Attorney, Agent, or Firm* — Eversheds Sutherland (US) LLP; Christopher C. Bolten; Robert D. Ward

(57) ABSTRACT

Bio resin paperboard containers and cartons may include a bio resin laminated paperboard (BLP) that includes a sheet of paperboard having a first side and a second side opposite the first side; a first layer of bio resin laminated on the first side of the paperboard; and a second layer of bio resin laminated on the second side of the paperboard. Bio resins may include PEF, PBF, PTF, PPF, GPE, GPET, PLA, PDLA, PLLA, PHA, and PHBH. Methods may utilize a roll of BLP to form bio resin paperboard containers.

17 Claims, 10 Drawing Sheets

(56) References Cited

U.S. PATENT DOCUMENTS

2011/0113733 A1  5/2011  Franic
2011/0274892 A1  11/2011 Chang
2013/0011631 A1  1/2013  Sakellarides \* cited by examiner

BIO RESIN PAPERBOARD CONTAINERS AND CARTONS

BACKGROUND OF THE INVENTION

The present invention generally relates to bioplastic aseptic containers, bio resin paperboard cartons, and more specifically bio resin paperboard containers and cartons.

The task for an aseptic containers is to preserve over time the nutritional value, the quality and taste of the product inside, protecting it from exposure to contaminants. In particular, this kind of container is used for the packaging of a wide range of products such as milk and dairy products, fruit juices, non-carbonated drinks, wine, tomato sauce, or dry foods such as cereals. The contents may be pasteurized or sterile and thus the cartons can be referred to as aseptic cartons. These laminated cartons are made with plastic layers over paperboard, but today we have bio resin films and liquid glass, which meet FDA food contact standards, and can replace plastic layers and improve the carbon footprint, sustainable and environmental parameters and compostability of the product such that one can achieve zero waste.

Renewable chemicals from vegetable feed stocks such as sugars, vegetable oils, organic acids, glycerol and others have been proposed as monomers for polymer production. Carbohydrates and lignin are the major sources for aromatic monomers. Chemicals 2, 5-furandicarboxylic acid (FDCA) and vanillic acid are important examples of such aromatic monomers. FDCA has been screened to be one of the most important building blocks or top value-added chemicals derived from biomass by the U.S. Department of Energy. Approaches to the preparation of hydroxymethylfurfural lead the way to the large-scale production of FDCA. The latter can used for the production of polyesters bearing furan moieties such as poly (ethylene 2, 5-furandicarboxylate) (PEF), poly (butylene 2, 5-furandicarboxylate) (PBF) and poly (trim ethylene furandicarboxylate) (PTF), and poly (propylene 2, 5-furandicarboxylate) (PPF) which can be bio based alternatives of terephthalates. Terephthalate is a class of high performance thermoplastic polyesters that includes poly (polyethylene terephthalate) PET, poly (butylene terephthalate) (PBT) and poly (propyleneterephthalate) (PPT). Terephthalates have advantageous properties and are used in a wide range of applications. However, terephthalate and its precursors are fossil based. Non FDCA plant or sugarcane based bio resins, namely, green polyethylene, (GPE) and green polyethylene terephthalate (GPET), and para xylene, are other non-compostable bio resins. Non-compostable resins include, PBF, PEF, PTF, PPF, GPE, GPETE and par xylene. These resins are available as biaxial films and can be metalized with aluminum and tin by vapor deposition.

There are bio resin that are compostable. These resins include polylactic acid (PLA) from corn and cellulose, Poly3-hydoxybutrate-3-hydroxyhexxanate (PHBH) from a fermentation process using glucose and propionic acid as the carbon source for *Alcaligenes eutrophus*, and polyhydroxy-alkanoate (PHA) derived by plant fermentation. Poly L lactide (PLLA) and poly D lactide (PDLA) are forms or homo-polymers of PLA. These are compostable and can be degraded to make eco-friendly compost or can lead to zero waste. These resins are also available as biaxial films and can be metalized with aluminum.

Liquid glass is made from silicon dioxide, which is a natural element from silica or sand ("glass"). An ultra thin layer of liquid glass can be used to provide a barrier layer to improve permeation properties.

Cartons can be made from bio resin that meet FDA food contact standard, offer a smaller carbon footprint, and eliminate most of plastic used in these cartons. Paperboard containers are frequently used for such packaging. At times, it is desirable to offer a re-closeable container such that consumers can remove a small portion of the content or item and then reseal the container. These containers are generally made form multi laminated paper board using bio resins and permeation properties can be addressed by an aluminum or tin foil or bio resin metalized films or a layer of liquid glass.

Many food products are packaged in a paperboard carton in which the contents are further contained in a flexible bag or pouch. The bag or pouch is typically used to provide sufficient barrier properties to keep the food fresh. In order to avoid using a bag or pouch, it is necessary to provide a paperboard packaging container that offers equivalent barrier properties. A bio resin laminate paperboard, BLP, with a bio resin metalized or aluminum foil layer, helps achieve this barrier, such that the pouch or bag can be eliminated.

It would be desirable to provide a bio resin laminated paperboard for cartons and containers.

SUMMARY OF THE INVENTION

In one aspect of the present invention, a device includes a bio resin laminated paperboard (BLP) that further includes: a sheet of paperboard having a first side and a second side opposite the first side; a first layer of bio resin laminated on the first side of the paperboard; and a second layer of bio resin laminated on the second side of the paperboard.

In another aspect of the present invention, a material includes a multi ply paperboard laminated with inner and outer layers of bio resin selected from the group consisting of: PEF, PBF, PTF, PPF, GPE, GPET, PLA, PDLA, PLLA, PHA, and PHBH.

In yet another aspect of the present invention, a method includes providing a sheet of paperboard in board caliper range of 0.15-0.25 inch and basis weight of 150-300 pounds; laminating a first layer of adhesive and a first layer of bio resin on a first side of the paperboard; laminating a second layer of adhesive and a second layer of bio resin on a second side of the paperboard, thereby providing a bio resin laminated paperboard (BLP); forming the BLP into a roll; removing and cutting sections of BLP from the roll to form blanks; and folding the blanks into bio resin paperboard containers.

DETAILED DESCRIPTION

Figure 1:
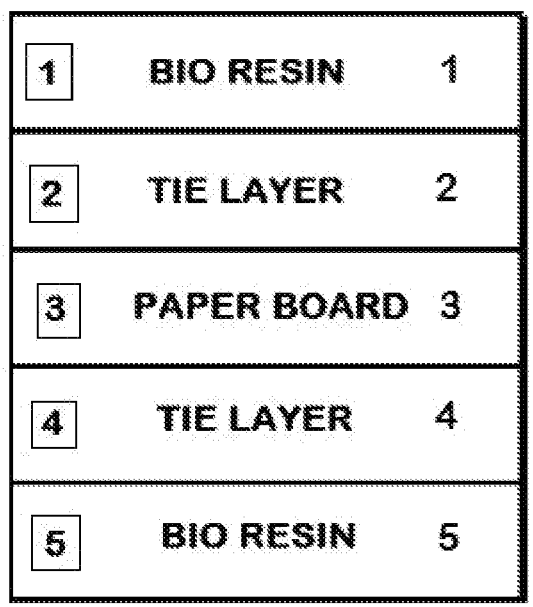
FIG. 1 depicts an embodiment of the present invention.

The preferred embodiment and other embodiments, which can be used in industry and include the best mode now known of carrying out the invention, are hereby described in detail with reference to the drawings. Further embodiments, features and advantages will become apparent from the ensuing description, or may be learned without undue experimentation. The figures are not necessarily drawn to scale, except where otherwise indicated. The following description of embodiments, even if phrased in terms of "the invention" or what the embodiment "is," is not to be taken in a limiting sense, but describes the manner and process of making and using the invention. The coverage of this patent will be described in the claims. The order in which steps are listed in the claims does not necessarily indicate that the steps must be performed in that order.

An embodiment of the present invention generally provides a bio resin laminate paperboard (BLP) used to make cartons.

An object of the present invention is to provide a bio resin laminated paperboard, BLP for paper cartons with spout and a removable cap or lid, made from renewable bio resins, such as non-compostable GPE, GPET, PBF, PEF, PTF, PPF and para xylene compostable bio resins PLA, PHA, PHBH, PDLA, and PLLA. The compostable bio resins may include a flex agent such as ATCB, PBAT and PCL.

Bio resins derived from a renewable resource may be used to make bio resin laminated paperboard (BLP), which is converted or formed into paperboard cartons. Embodiments of the present invention may use these bio resins to replace plastic used in cartons or aseptic cartons. The BLP and cartons may also be made from bio resins that are compostable. Compostable resins include polylactic acid (PLA), Poly3-hydoxybutrate-3-hydroxyhexxanate (PHBH), and polyhydroxyalkanoate (PHA). Poly L lactide (PLLA) and poly D lactide (PDLA) are forms or homo-polymers of PLA. PLA, PHA, PHBH, PDLA, and PLLA are compostable and can be degraded to make eco-friendly compost or humus.

Compostable bio resins include PLA, PHA, PHBH, PDLA, and PLLA. These resins are generally not flexible and a flex agent may be added. Acetyl tributyl citrate (ATBC) is a transparent biodegradable plasticizer having low toxicity. It is also referred to as tributyl acetyl citrate, butyl acetylcitratem, O-acetyl citric acid tributyl ester, ATCB, or acetyl tributylcitrate. It has molecular formula $C_{20}H_{34}O_8$. Other flex agents are poly (butylene adipate) (PBA), Poly ε-5 caprolactone (PCL), and poly (butylene adipate-co-terephthalate) (PBAT). In an embodiment, ACTB, PBAT and PCL are used in ratio of 5 to 20% by weight.

A barrier layer may help reduce permeation of oxygen, water vapor and carbon dioxide. Embodiments of a barrier layer may include aluminum, tin, GPE, GPET, PBF, PEF, PTF, ethylene vinyl alcohol copolymer (EVOH), metalized bio resin film, or liquid glass layer.

Embodiments of BLP and cartons may be made from renewable bio resins derived from plants or a renewable resource as mentioned above. The bio resin laminate paperboard, BLP, used to make the cartons may be made from bio resin mentioned above with, for example: a metalized bio resin film, with vapor deposition metal layer thickness 5-100 nm; or aluminum or tin foil, thickness of 10-90 microns; a monolayer bio resin extruded film; a multi-layered bio resin extruded film; a multi-layered bio resin laminated film; or a co-extruded bio resin film co extruded using paperboard. Embodiments of a sheet of paperboard may be have a thickness or board caliper range of 0.15-0.25 inch (350-700 microns) and basis weights of 150-300# (222-444 gsm). Embodiments of extruded bio resin films may have a thickness of 5-50 microns per layer of resin. The liquid glass layer may be rolled or sprayed on the paperboard or any other of the laminated layer, with thickness of 1-10 microns.

Another object of the present invention is for PLA resin to coat a 10 to 30 pound paper substrate on one side with PLA resin, instead of polyethylene for fast food, sandwich and/or burger wrappers. For gum wrappers, currently an 8 to 30 pound paper substrate is laminated to an extruded foil using polyethylene 60 to create the single stick gum wrappers (paper/poly/foil lamination). In the present invention, PLA may be substituted for polyethylene creating a paper/PLA/foil lamination. In the present invention PLA resin is substituted for the polyethylene, forming a paper/PLA/paper structure. An advantage of using PLA resin may include the compostability of the wrapper, as well as its properties for retaining flavor and aroma and protecting against moisture.

Embodiments may include containers having re-closeable spout fitments that can be used for liquid and dry food packaging. Embodiments may include a spout that allows access to the insides of the container, and a removable cap, lid or resealable closure. Embodiments of a spout and cap may made be made from a first BLP, and the walls of the container may be made from a second type, such as with different compositions or different thicknesses.

Embodiments of extruded layers may be made with a single or multi-layer co extrusion process and may be laminated to achieve a web, consisting of bio resin multi-laminated paperboard or BLP. The multi-layer laminate paperboard may be used to make the cartons. The sheet of paperboard may be within board caliper range of 0.15-0.25 inch (350-700 microns) and basis weights of 150-300# (222-444 gsm). The paperboard can be one or multiply plies.

Embodiments may have bio resin metalized films from bio-based propylene homopolymer, ethylene homopolymer, propylene-ethylene copolymer, propylene-ethylene-butene copolymer, or ethylene-butene copolymer. The metal layer of aluminum may be produced by vapor deposition processes, preferably in a thickness of about 5 to 100 nm and an optical density of about 1.5-5.0. The metalized films, for example, may include MPEF, metalized poly ethylene 2, 5 furandicaoxylate or MPPF, metalized poly propylene 2, 5 furandicaoxylate.

In embodiments, the thickness of aluminum foil varies from 10 to 60 microns, to help with zero water vapor, oxygen permeation and provides a light barrier. The fourth tie layer may include another tie or adhesive layer. Layer five may include a sheet of paperboard to give the carton firmness and shape. Sixth layer may include another tie or adhesive layer. Seventh or top layer may include a bio resin layer and protects against outside elements. Bio resin may be sealed in a liquid, and included in a layer or lamination.

In embodiments, the metalized side may be on an outside of the container or on an the inside of the container. A bio resin laminate paperboard (BLP) may be made using metalized bio resin film. The BLP may be used make cartons made from a renewable resource. The bio resin and metal foil layers range may range from 10 to 90 microns. The bio resin films may be biaxially oriented and can be metalized by vapor deposition.

As depicted in FIG. 1, embodiments of the present invention may provide an extruded paperboard laminate. Embodiments may include a substrate paperboard 3. The paperboard 3 may have a first side or outer side, upon which a first bio resin 1 is extruded, and a second side or inner side, upon which a second bio resin 5 is extruded. Embodiments may include a first tie layer 2 between the paperboard 3 and first bio resin 1, and a second tie layer between the paperboard 3 and second bio resin 5. The tie layer may be formed or applied onto the substrate, and then the bio resins may be applied onto the tie layers, or the tie layers and bio resins may be extruded in a single step.

Figure 2:
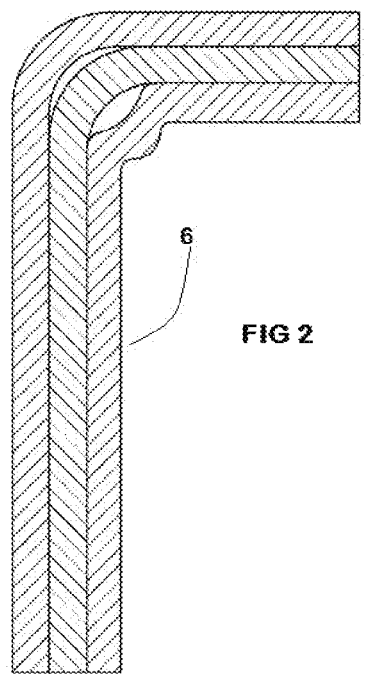
FIG. 2 depicts a cross section of a 3-ply paper according to the present invention.

As depicted in FIG. 2, embodiments may include a three-ply laminate 6 with three plies. The plies may include an internal substrate with inner and outer layers of bio resin. The bio resins selected to form the multi-layer carton may vary depending upon the goal or intended use of the multilayer laminate. As depicted, straight sections of the laminate may have parallel plies that rest entirely against each other, but at the corners or angles, the laminates may have a small separation between them. This may be the result of extrusion or other layering processes, followed by bending of the material.

Figure 3:
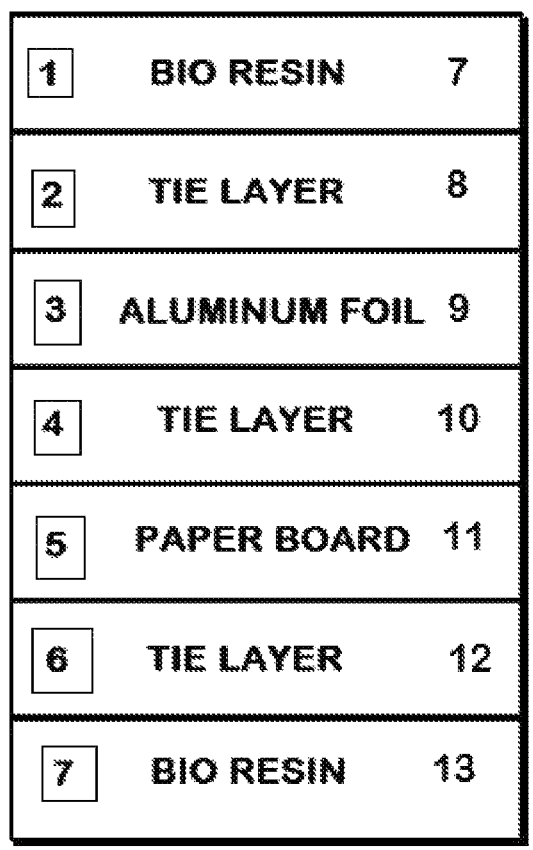
FIG. 3 depicts an embodiment of the present invention having a layer of aluminum foil.

As depicted in FIG. 3, embodiments may include an outer or first layer of bio resin 7, then a first tie layer 8, aluminum foil 9, a second tie layer 12, a layer of paper board 11, a third tie 12, and an inner or second layer of bio resin 13. Alternate embodiments may have the paper board outside the aluminum foil.

Figure 4:
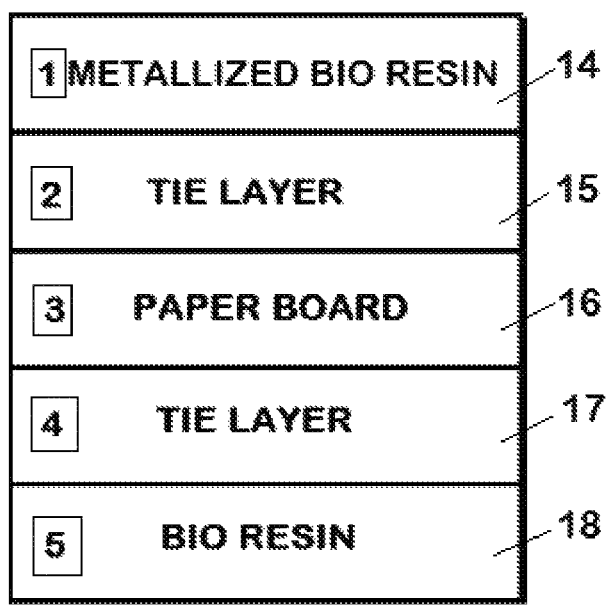
FIG. 4 depicts an embodiment of the present invention having a metalized layer of bio resin.

As depicted in FIG. 4, embodiments of a metalized bio resin film 14 may form an outer or inner barrier for cartons. A paperboard substrate 16 may have a metalized bio resin film 14 on a first side and a second bio resin film 18 on a second side. The metalized film of bio resin film 14 may be laminated or applied onto a first side of the paperboard 16 layer, and a second layer bio resin 18 is applied to the other side of the paperboard. Tie layers 15, 17, such as adhesive, may be included between the paperboard and the bio resin films to tie the layers together and provide a laminated wall for a container.

Figure 5:
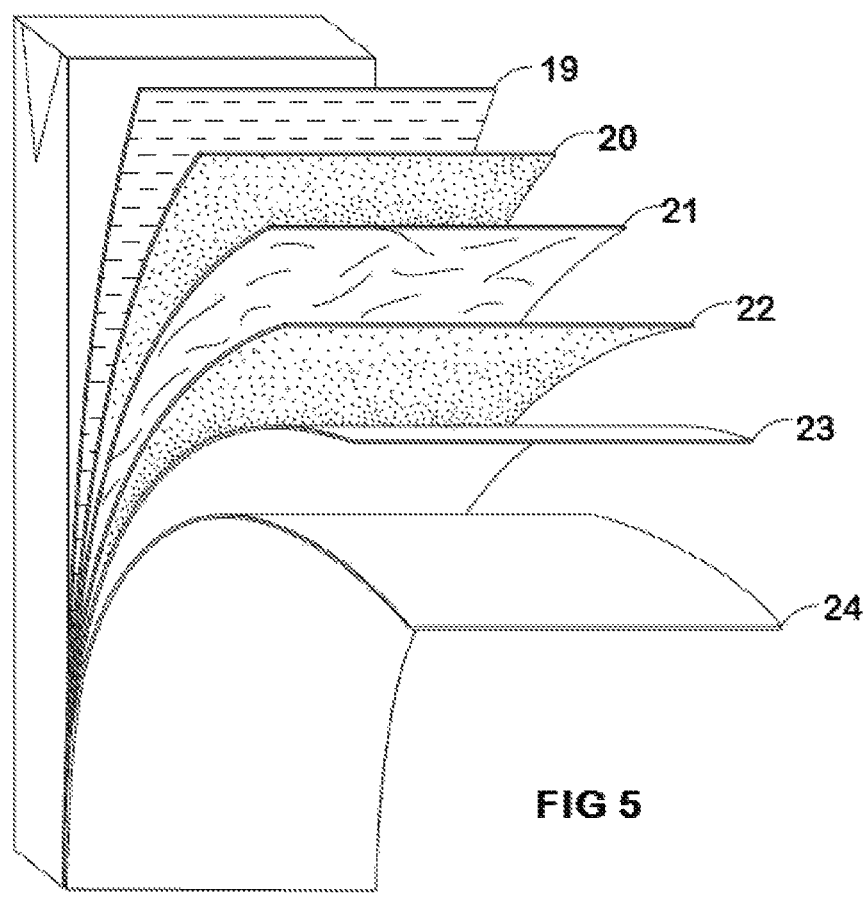
FIG. 5 depicts layers of a multi-layer paperboard carton material according to the present invention.

As depicted in FIG. 5, embodiments of a multi laminated paperboard carton wall may include many layers. This may provide a wall for a bioplastic container or carton. Embodiments may include an inner first layer 19, which may be a bio plastic resin sealed in a liquid. The next layer may be a tie or adhesive layer 20 followed by a metal layer 21 to help with reducing permeation of water vapor. Oxygen and carbon dioxide also act as a light barrier layer. A next layer may be a paperboard layer 22 or main layer giving the wall a firmness and shape. This may be followed in order by a tie layer or adhesive layer 23. A final outer layer 24 or top layer may be a bio resin layer that protects against outside elements.

Figure 6:
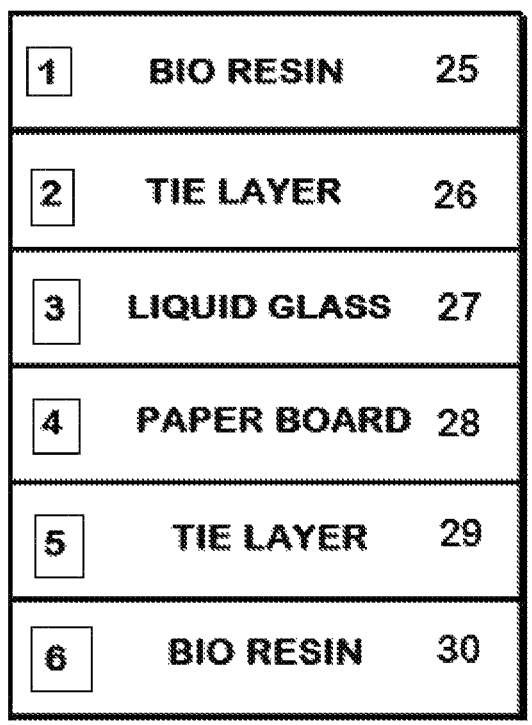
FIG. 6 depicts an embodiment of the present invention having a liquid glass.

As depicted in FIG. 6, embodiments may include an inner first layer 25, sealed in a liquid. The next layer is tie layer 26, followed by a liquid glass layer 27, then paperboard layer 28 giving it firmness and shape. There are two adhesive layers 26 and 29, and final outer layer 30, which is a top layer and a bio resin layer that protects against outside elements. The liquid glass layer forms a barrier layer against moisture or water vapor, oxygen and carbon dioxide. The liquid glass layer is not limited to this layer only and can be co applied with any other bio resin layer, and this will be further illustrated in the table 1 below.

Embodiments may have 2 or more layers of material, such as 5 or 7 layers that alternate with internal layers of adhesive. Embodiments may include, but are not limited to, the following listing of examples of combinations of laminated layers that can be achieved with paperboard as a base as per table 1

TABLE 1

| | | Example | | | | | | | | |
|---|---|---|---|---|---|---|---|---|---|---|
| | Resins | 1 | 2 | 3 | 4 | 5 | 6 | 7 | 8 | 9 |
| 1 | PLA | 1 | 1 | | | | | 1 | | 2 |
| 2 | PLLA | | | 1 | | 1 | 1 | | | |
| 3 | Alu | 1 | | | | 1 | 1 | | | |
| 4 | PDLA | | | | 1 | | | | 1 | |
| 5 | GPE | | | 1 | 1 | | | | | |
| 6 | PEF | | | | | 1 | | | 1 | |
| 7 | PTF | | | | | | 1 | | | |
| 8 | PPF | | | | | | | 1 | | |
| 9 | EVOH | | | | | | | 1 | | |
| 10 | MPEF | 1 | | | | | | | | |
| 11 | MPTF | | 1 | | | | | | | |
| 12 | MPPF | | | | 1 | | | | 1 | |
| 13 | Liquid Glass | | | | | | | | | 1 |
| 14 | Paper Brd | 1 | 1 | 1 | 1 | 1 | 1 | 1 | 1 | 1 |
| 14 | Adhesive | 3 | 2 | 2 | 2 | 3 | 3 | 3 | 3 | 2 |
| Layers | | 7 | 5 | 5 | 5 | 7 | 7 | 7 | 7 | 6 |

Figure 7:
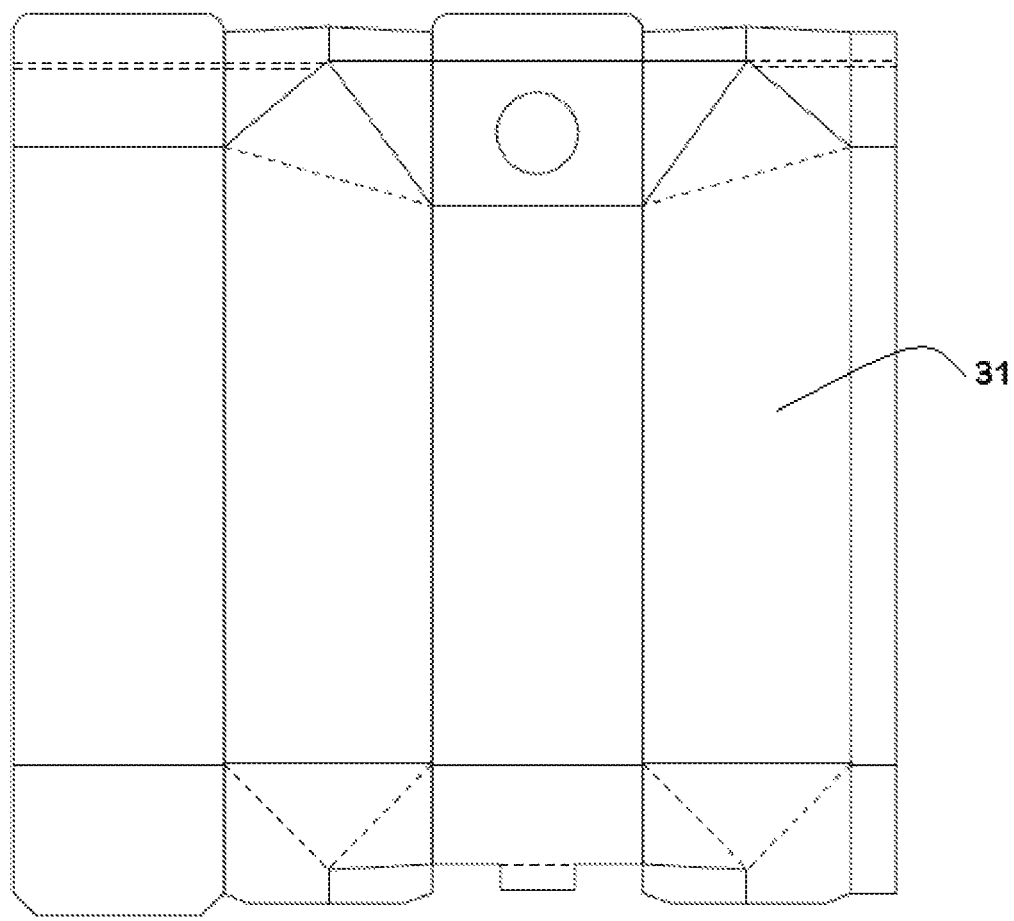
FIG. 7 depicts an embodiment of a blank according to the present invention.

As depicted in FIG. 7, BLP may be used to derive carton blanks 31 which vary in size and dimensions based on the carton final shape and size.

Embodiments may have a folded closed bottom. In an embodiment, a carton blank 31 may be cut, scored, and formed at the packager. Alternatively, BLP may be provided in pre-assembled tubes delivered to the packager for completion and filling. The bio resin laminate paperboard BLP may receive a waterproof coating, and be printed and pre-assembled into rolls of tubes or flats ready for cutting the blanks. The blanks may be formed and the bottom-sealed. The final steps may include filling and top-sealing, stamping and printing the date.

Embodiments of cartons made from a BLP may come in various size and shapes for consumer convenience.

Figure 8:
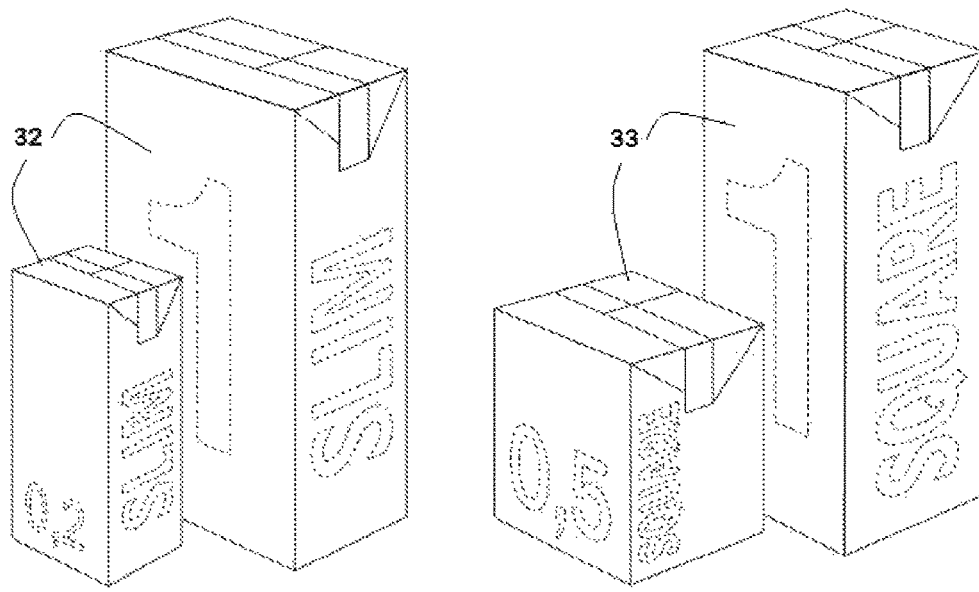
FIG. 8 depicts embodiments of flat top cartons according to the present invention.

As depicted in FIG. 8, embodiments of bioplastic boxes may have side walls that are slim boxes 32 or square boxes 33 with a flat top and be of varying height again depending on the size of the carton. Sizes may include, for example, 4 oz. to 128 oz.

Figure 9:
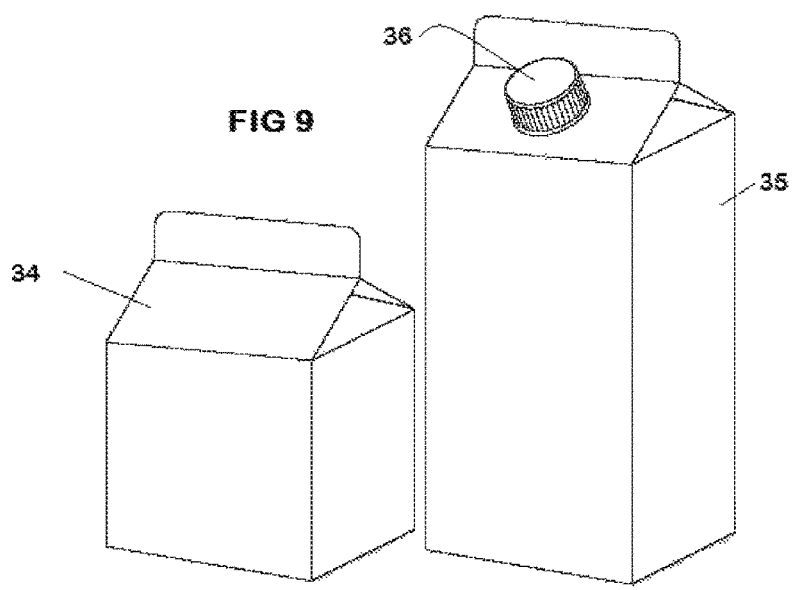
FIG. 9 depicts embodiments of gable top cartons according to the present invention.

As depicted in FIG. 9, embodiments may have a gable top. Embodiments may include a small size carton 34 or a large size carton 35 with a mounted spout and removable cap 36.

Figure 10:
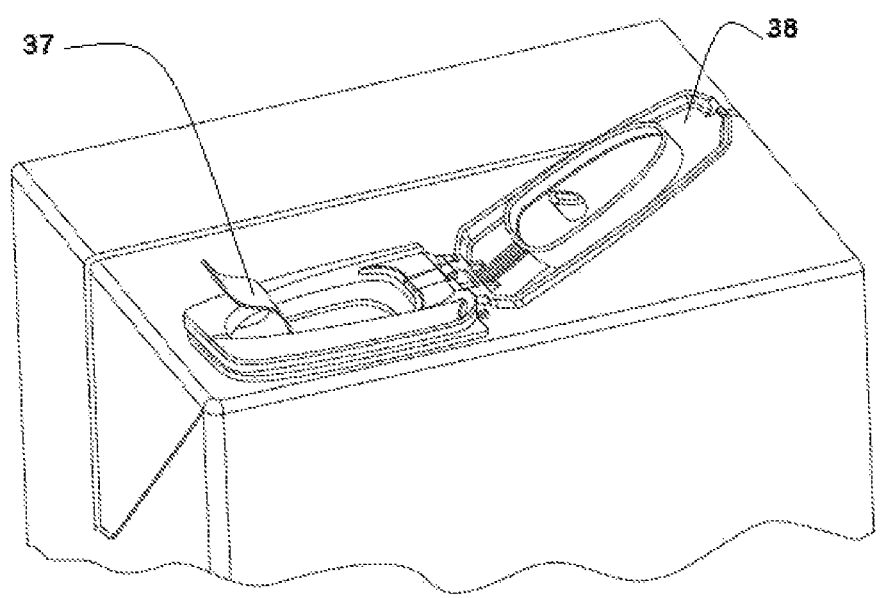
FIG. 10 depicts an embodiment of lid and foil seal according to the present invention.

As depicted in FIG. 10, embodiments may include a resealable lid 38 and a removable seal or foil tab 37. The foil tab 37 may provide security and protect the product until the product is to be used.

Figure 11:
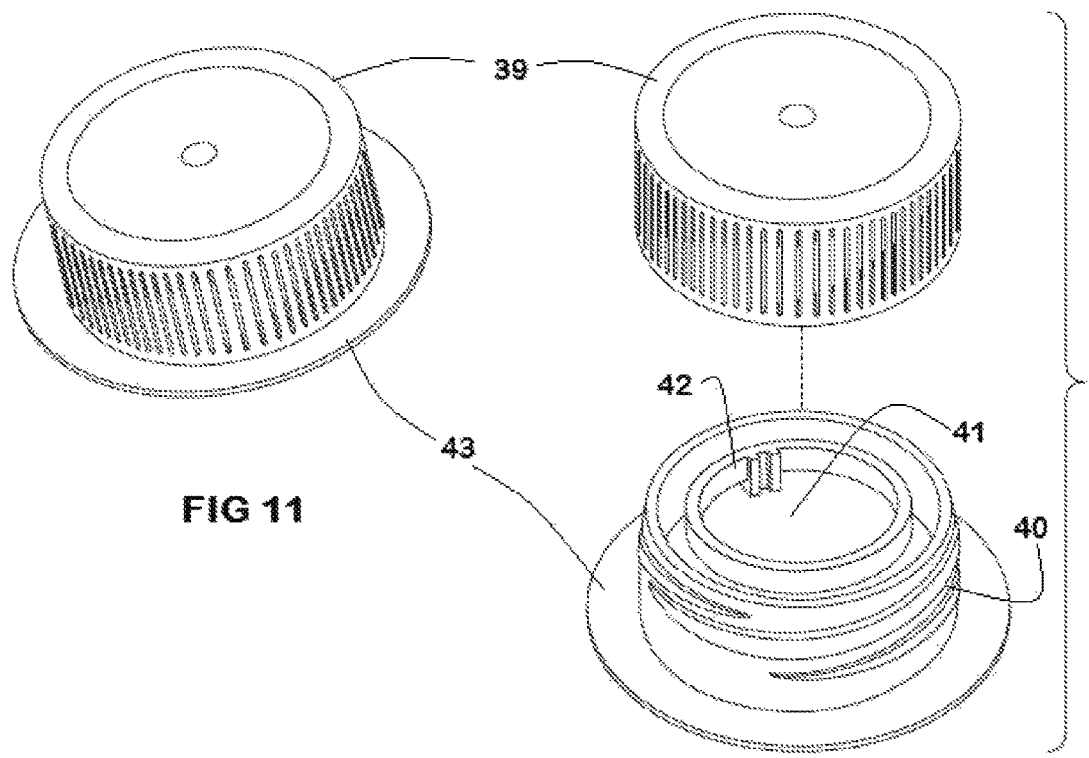
FIG. 11 depicts an embodiment of removable cap and pour spout with a tamper evident seal according to the present invention.

As depicted in FIG. 11, embodiments may have a removable cap 39 made from bio resins, which may or may not have a break band rim. Embodiments may include a spout made from bio resins with threading 40 that engages with the cap 39. Embodiments may have tamper-evidence features 41 such as a pull-ring 42.

Figure 12:
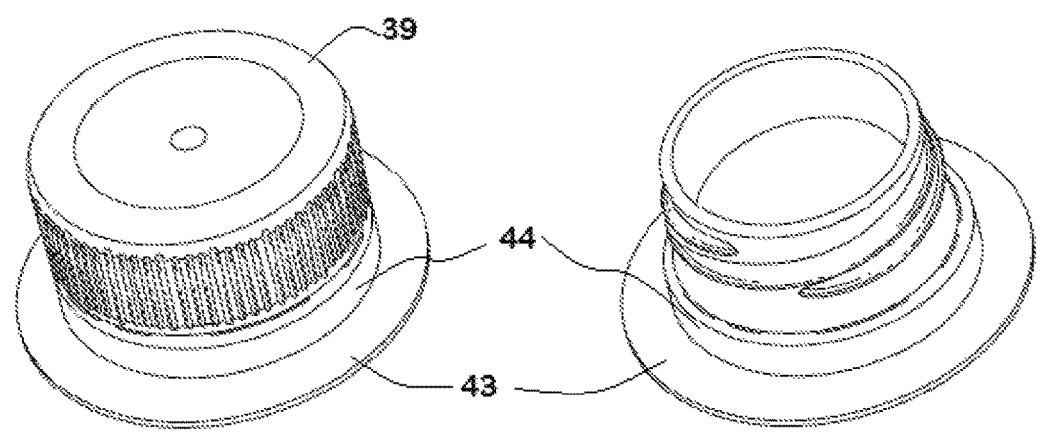
FIG. 12 depicts an embodiment of a removable cap and pour spout with break band according to the present invention.

As depicted in FIG. 12, a removable cap 39 may have a spout 43 and external break bands 44.

Embodiment of patterned removable caps 39 or lids 38 may provide easy opening and closing, with threading 40 that prevents spills and allows resealing. Internal tamper-evident features 41 may be aluminum and may include foil tabs 37 and pull-rings 42. External break bands 44 may provide visible security. Embodiments of cap, lid, tamper evident seal, pull ring and break ring may be made from bio resins. A spout 43 and removable cap 39 may provide the ability to seal, shake, and reseal without leaks. The cap 39 and lid 38 help maintain the original freshness and flavor of the product, increase shelf life, and extend freshness making them the new standard for flat top or gable top packaging.

Figures 13, 14:
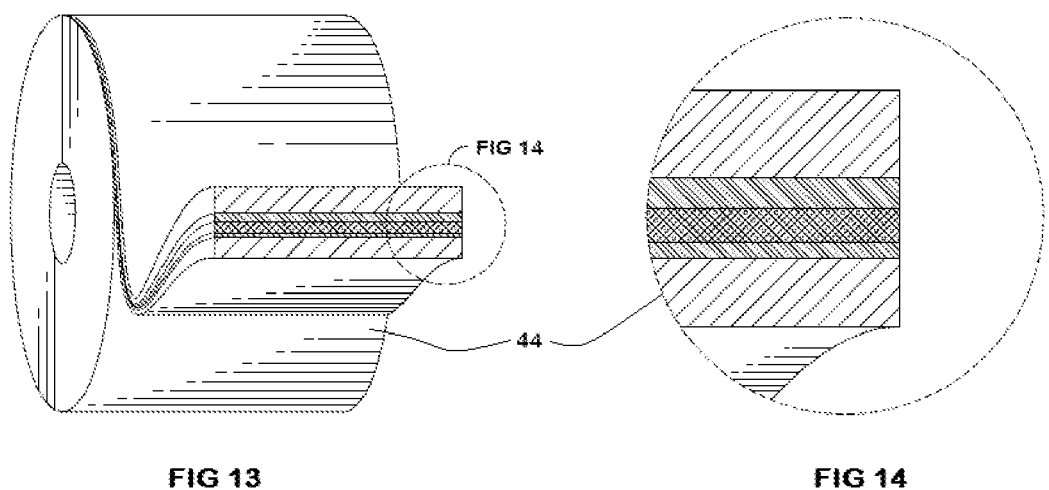
FIG. 13 depicts an embodiment of a printed bio resin laminate paperboard web.
FIG. 14 depicts a close up of a portion of the web of FIG. 13 emphasizing external break bands.

As depicted in FIGS. 13 and 14, embodiments of BLP cartons may be made from bio resins by having a printed BLP web 44, supplied on a roll. BLP 44 may be used to derive carton blanks 31, as in FIG. 7, which vary in size and dimensions based on the carton final shape and size. An embodiment of a method for making a container may include removing and cutting sections of BLP 44 from the roll to form blanks 31, and then folding the blanks into bio resin paperboard containers.

Embodiments may include a paperboard laminate made using bio resin, in board caliper range of 0.15-0.25 inch (350-700 microns) and basis weights of 150-300# (150 to 300 pounds, or 222-444 gsm); a carton made with bio resin laminate paperboard with is in board caliper range of 0.15-0.25 inch (350-700 microns) and basis weights of 150-300# (222-444 gsm); a paperboard made with bio resin metalized films, in board caliper range of 0.15-0.25 inch (350-700 microns) and basis weights of 150-300# (222-444 gsm); a carton made with a bio resin metalized film or liquid glass coating; or a carton with bio resin spout, removable cap or lid.

Embodiments of a bioplastic material may include a bio resin selected from the group consisting of: poly (ethylene 2, 5-furandicarboxylate) (PEF), poly (butylene 2, 5-furandicarboxylate) (PBF), poly (tri methylene furandicarboxylate) (PTF), poly (propylene Poly (propylene 2, 5-furandicarboxylate), green poly ethylene (GPE), green ethylene terephthalate (GPET), polylactic acid (PLA), poly D lactide (PDLA), poly L lactide (PLLA), polyhydroxyalkanoate (PHA), and poly3-hydoxybutrate-3-hydroxyhexxanate (PHBH). Embodiments may include metalized films having the same bio resins in metalized form. Embodiments may include multi ply paperboard laminated with bio resins, in board caliper range of 0.15-0.25 inch (350-700 microns) and basis weights of 150-300# (222-444 gsm). Embodiments may include bio resin laminated paperboard with liquid glass.

I claim:

1. A bio resin laminated paperboard (BLP) device comprising:
    a sheet of paperboard having a first side and a second side opposite the first side:
    a first layer of bio resin laminated on the first side of the paperboard; and
    a second layer of bio resin laminated on the second side of the paperboard,
    wherein the bio resin of the first layer of bio resin or the second layer of bio resin, or both, is selected from the group consisting of:
    poly (ethylene 2, 5-furandicarboxylate) (PEF);
    poly (butylene 2, 5-furandicarboxylate) (PBF);
    poly (tri methylene furandicarboxylate) (PTF); and
    poly (propylene 2, 5-furandicarboxylate) (PPF).

2. The device of claim 1, wherein the sheet of paperboard has a board caliper range of 0.15 to 0.25 inches.

3. The device of claim 1, further comprising:
    a first tie layer of adhesive between the paperboard and the first layer of bio resin; and
    a second tie layer of adhesive between the paperboard and the second layer of bio resin.

4. The device of claim 1 wherein the bio resin of one of the first layer of bio resin or second layer of bio resin comprises a metalized bio resin.

5. The device of claim 1, further comprising a layer of aluminum foil between the sheet of paperboard and the second layer of bio resin.

6. The device of claim 1, further comprising a layer of liquid glass between the paperboard and the second layer of bio resin.

7. The device of claim 1, wherein the device is configured to be folded into a container.

8. The device of claim 1, wherein the device forms walls of an aseptic carton for retaining liquids, and the device further comprises:
    a spout comprising a second bio resin; and
    a resealable closure removably coupled to the spout also comprising the second bio resin.

9. The device of claim 1 wherein:
    the sheet of paperboard has a board caliper range of 0.15 to 0.25 inches;
    the device is a configured to form a carton; and
    the device further comprises a first tie layer of adhesive between the paperboard and the first layer of bio resin and a second tie layer of adhesive between the paperboard and the second layer of bio resin.

10. A material comprising:
    a multi ply paperboard laminated with inner and outer layers of bio resin, wherein the bio resin of at least one of the inner layer of bio resin or the outer layer of bio resin, or both, is selected from the group consisting of:
    poly (ethylene 2, 5-furandicarboxylate) (PEF),
    poly (butylene 2, 5-furandicarboxylate) (PBF),
    poly (tri methylene furandicarboxylate) (PTF), and
    poly (propylene 2, 5-furandicarboxylate) (PPF).

11. The material of claim 10, wherein the paperboard is in a board caliper range of 0.15-0.25 inch.

12. The material of claim 10, further comprising:
    a layer of metalized bio resin, aluminum foil, or liquid glass; and
    tie layers of adhesive between the paperboard and the layers.

13. The material of claim 10, wherein the material is configured to be folded into a container.

14. The material of claim 10, wherein the material forms walls of an aseptic carton for retaining liquids, and the material further comprises:
    a spout comprising a second bio resin; and
    a resealable closure removably coupled to the spout also comprising the second bio resin.

15. The material of claim 10, further comprising a layer of aluminum foil between the multi ply paperboard and at least one of the inner layer of bio resin or the outer layer of bio resin.

16. The material of claim 10, further comprising a layer of liquid glass between the multi ply paperboard and at least one of the inner layer of bio resin or the outer layer of bio resin.

17. The material of claim 10, wherein the bio resin of at least one of the inner layer of bio resin or the outer layer of bio resin comprises a metalized bio resin.

* * * * *